J. C. RYAN.
LIGHT PROJECTING APPARATUS.
APPLICATION FILED MAY 8, 1920.
1,382,016. Patented June 21, 1921.
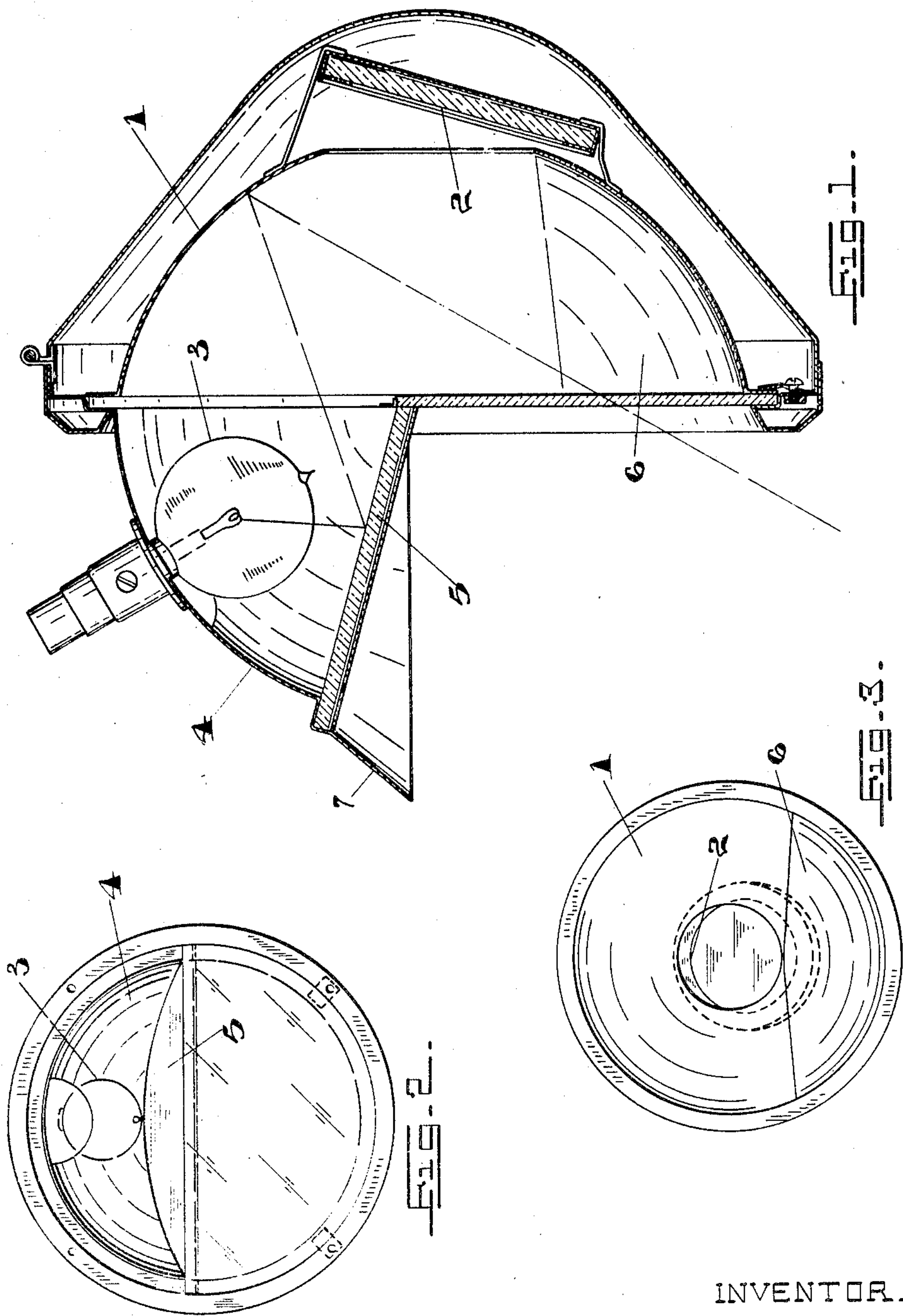
INVENTOR.
J. C. Ryan.
BY J. Edward Maybee.
ATTY.

UNITED STATES PATENT OFFICE.

JOHN C. RYAN, OF TORONTO, ONTARIO, CANADA.

LIGHT-PROJECTING APPARATUS.

1,382,016. Specification of Letters Patent. Patented June 21, 1921.

Application filed May 8, 1920. Serial No. 379,912.

*To all whom it may concern:*

Be it known that I, JOHN C. RYAN, a subject of the King of Great Britain, of the city of Toronto, in the county of York, Province of Ontario, Canada, have invented certain new and useful Improvements in Light-Projecting Apparatus, of which the following is a specification.

This invention relates particularly to light projecting apparatus designed for use as a headlight for motor vehicles, and my object is to devise apparatus which will so control the light projected that the beams will not strike the eyes of the driver of an approaching vehicle, and yet will give ample illumination where such illumination will be of the greatest service to the driver of the vehicle carrying the apparatus.

I attain my object by means of the constructions hereinafter described and illustrated in the accompanying drawings in which—

Figure 1 is a vertical section of my improved light projecting apparatus;

Fig. 2 a rear view of the same; and

Fig. 3 a front view of the concave reflector with the plane mirror located at the central part of its reflecting surface.

In the drawings like numerals of reference indicate corresponding parts in the different figures.

1 is a polished concave reflector of the usual approximately paraboloidal shape. The center part of its reflecting surface, however, is formed by a plane mirror 2, preferably formed of silvered glass. The preferred arrangement is to cut a circular portion out of the central part of the reflecting mirror and to support the plane mirror behind the opening. This plane mirror is tilted back from the vertical for a purpose which will hereinafter appear.

Supported above the optical axis of the reflector and in front of the rim of the reflector is a source of light 3 shown as an ordinary electric bulb. Behind the source of light is a shield 4, which shields the source of light so that direct rays therefrom will not reach the eyes of the driver of a vehicle approaching the headlight. This shield is also employed as a reflector to direct the light from the source into the concave reflector. Preferably only that part of the shield immediately behind the source of light is given a polished reflecting surface, the remainder of the surface being of a light diffusing and more or less light absorbing nature. The inclination of the mirror referred to above is such that direct rays of light striking the mirror from the source of light are reflected substantially parallel to or below the optical axis of the apparatus. Below the shield is located a flat mirror 5, preferably of silvered glass, which directs rays of light striking it from the source into the upper part of the reflector 1, whence they are again reflected either to strike the mirror 2 or the lower part of the reflecting surface of the concave reflector 1. The lower part 6 of the concave reflector is preferably formed as a light diffusing and absorbing surface. A coat of light colored enamel will answer the purpose satisfactorily.

The shield 4 is preferably provided with an extension 7 extending down as far as the optical axis of the apparatus. This will cut off any stray reflected rays which might otherwise pass up to the eyes of the driver of an approaching vehicle. The under surface of the shield extension 7 and the flat mirror 5 are preferably enameled white or otherwise given a light diffusing reflecting surface. The purpose of this is to give a diffused glow of light adjacent the vehicle, while a more brilliant illumination is given on the roadway at some distance ahead.

I find with my device that not only is all objectionable glare shielded from the eyes of a person meeting the light, but also that for twenty feet ahead of the car the light is not sufficiently brilliant to interfere with clear vision, so that if two cars were approaching, by the time they are within forty feet of each other, not only is there no glare, but no excess light to interfere with clear vision. At a distance, while good light is thrown on the road, none of this extends up sufficiently far from the roadway to objectionable.

A further advantage of my headlights is that they will illuminate the front part of each of the front wheels of the vehicle carrying them and thus show the driver of an approaching vehicle the exact position of the vehicle carrying the lights.

What I claim as my invention is:—

1. In light projection apparatus, the combination of a concave reflector having as the central part of its reflecting surface a plane mirror; a source of light supported outside the concave reflector above the optical axis thereof and facing the plane mirror; and means for reflecting the light from the source into the concave reflector, the plane mirror being set at a suitable inclination to reflect light received by it from the source.

2. In light projection apparatus, the combination of a concave reflector having as the central part of its reflecting surface a plane mirror; a source of light supported outside the concave reflector above the optical axis thereof and facing the plane mirror; and shielding means in front of said source of light and the upper part of the concave reflector, the plane mirror being set at a suitable inclination to reflect light received by it from the source.

3. In light projection apparatus, the combination of a concave reflector having as the central part of its reflecting surface a plane mirror and its lower concave part given a light diffusing surface; a source of light supported outside the concave reflector above the optical axis thereof and facing the plane mirror; and means for reflecting the light from the source into the concave reflector, the plane mirror being set at a suitable inclination to reflect light received by it from the source.

4. In a light projection apparatus, the combination of a concave reflector having as the central part of its reflecting surface a plane mirror and its lower concave part given a light diffusing surface; a source of light supported outside the concave reflector above the optical axis thereof and facing the plane mirror; and shielding means in front of said source of light and the upper part of the concave reflector, the plane mirror being set at a suitable inclination to reflect light received by it from the source.

5. In light projection apparatus, the combination of a concave reflector having as the central part of its reflecting surface a plane mirror; a source of light supported above the optical axis of the reflector; means for reflecting the light from the source into the concave reflector, comprising a concave reflector; a shield behind the source and a flat mirror below it inclined from its front edge downwardly and rearwardly, the plane mirror being set at a suitable inclination to reflect light received by it from the source.

6. In light projection apparatus, the combination of a concave reflector having as the central part of its reflecting surface a plane mirror; a source of light supported above the optical axis of the reflector; and means for reflecting the light from the source into the concave reflector comprising a concave reflector; a shield behind the source having its surface immediately behind the source brightly reflecting and its remote surface diffusing; and a flat mirror below it inclined from its front edge downwardly and rearwardly, the plane mirror being set at a suitable inclination to reflect light received by it from the source.

Signed at Toronto, Canada, this 26th day of April, 1920, in the presence of the two undersigned witnesses.

JOHN C. RYAN.

Witnesses:
J. EDW. MAYBEE,
ISABEL ROSS.